(12) United States Patent
Ito et al.

(10) Patent No.: US 7,047,840 B2
(45) Date of Patent: May 23, 2006

(54) POWER TRANSMISSION MECHANISM FOR AN ENGINE OF A VEHICLE

(75) Inventors: Katsuhiko Ito, Wako (JP); Yoshiaki Hori, Wako (JP); Mitsuru Saito, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 8 days.

(21) Appl. No.: 10/666,082

(22) Filed: Sep. 18, 2003

(65) Prior Publication Data

US 2004/0107795 A1    Jun. 10, 2004

(30) Foreign Application Priority Data

Sep. 27, 2002   (JP) .............................. 2002-283767

(51) Int. Cl.
*F16H 47/02* (2006.01)
(52) U.S. Cl. .................................. 74/733.1; 74/730.1
(58) Field of Classification Search ............... 74/730.1, 74/731.1, 732.1, 733.1; 60/445, 490, 491, 60/492
See application file for complete search history.

(56) References Cited

U.S. PATENT DOCUMENTS

| 5,201,691 A | * | 4/1993 | Doyle ......................... 475/53 |
| 6,357,413 B1 | * | 3/2002 | Ito et al. ................... 123/197.1 |
| 6,470,770 B1 | * | 10/2002 | Ito et al. .................... 74/730.1 |
| 6,857,494 B1 | * | 2/2005 | Kobayashi et al. ......... 180/243 |

FOREIGN PATENT DOCUMENTS

| JP | 01-132473 | * 5/1989 | ................. 180/6.2 |
| JP | 2001-343060 | 12/2001 | |

* cited by examiner

*Primary Examiner*—Ha Ho
(74) *Attorney, Agent, or Firm*—Hamre, Schumann, Mueller & Larson, P.C.

(57) ABSTRACT

A power transmission apparatus for an engine of a vehicle. The apparatus includes a starting clutch for smoothly connecting rotation of a crankshaft to a transmission upon starting of the vehicle, a hydrostatic continuously variable transmission for performing speed change depending upon a capacity difference between a swash plate hydraulic pump and a swash plate hydraulic motor to transmit rotation of the crankshaft at a reduced speed to a driving wheel, and a slider for moving a ball screw back and forth to change the angle of the swash plate of the swash plate hydraulic motor. The starting clutch can be a torque converter.

5 Claims, 5 Drawing Sheets

POWER TRANSMISSION MECHANISM FOR AN ENGINE OF A VEHICLE

TECHNICAL FIELD

This invention relates to a power transmission apparatus for an engine of a vehicle, and more particularly to a power transmission apparatus for a vehicle such as an off-road vehicle.

BACKGROUND

A power transmission apparatus for an engine of a vehicle which includes a hydrostatic continuously variable transmission is known. In the hydrostatic continuously variable transmission, rotation of a crankshaft is transmitted to a transmission through a starting clutch of the centrifugal clutch type, and speed change is performed depending upon a capacity difference between a swash plate hydraulic pump and a swash plate hydraulic motor. Consequently, the rotation of the crankshaft is transmitted at a reduced speed to a driving wheel. In the power transmission apparatus, a speed change driving shaft is rotated by a stepping motor to move a speed change driving member back and forth along the speed change driving shaft to change the angle of the swash plate of the swash plate hydraulic motor to perform speed change. See, for example, Japanese Patent Laid-Open No. 2001-343060.

In the prior art described above, control of the vehicle speed is performed by setting of an engine speed and a ratio (change gear ratio) of a hydrostatic continuously variable transmission. Therefore, upon low speed rotation upon which the torque generated by the engine is low, it is necessary to change the ratio of the continuously variable transmission by a great amount to the low ratio side. Further, in order to prevent a stall of the engine and prevent the vehicle speed from being rendered unstable, it is necessary to change the ratio frequently. As a result, in order to increase the stroke amount of the speed change driving member which moves along the speed change driving shaft, it is necessary to set the length of the speed change driving shaft long. Thus, there is a problem that this increases the scale of the stepping motor and gives rise to an increase in cost. Further, in order to cope with frequent changes of the ratio, it is necessary to raise the durability of the stepping motor and associated cost.

Further, the hydrostatic continuously variable transmission can be used also as a multi-step transmission by fixing the angle of the swash plate of the swash plate hydraulic motor. In this instance, however, similar problems apply also when a driver changes the ratio in accordance with the vehicle speed or the slope of the road surface. Further, significant problems can be associated with an off-road vehicle which runs on an irregular ground which exhibits frequent variations of the road surface situation.

SUMMARY

Therefore, the present invention provides a power transmission apparatus for an engine of a vehicle which can suppress the changing frequency of the ratio of a continuously variable transmission by compensating for driving force upon low speed rotation upon which the torque generated by an engine is low, and can reduce the overall width of the engine to raise the degree of freedom in mounting of the engine to achieve reduction of the cost.

In accordance with one aspect, a power transmission apparatus for an engine of a vehicle can include a starting clutch for smoothly connecting rotation of a crankshaft to a transmission upon starting of the vehicle, a hydrostatic continuously variable transmission for performing speed change depending upon a capacity difference between a swash plate hydraulic pump and a swash plate hydraulic motor to transmit rotation of the crankshaft at a reduced speed to a driving wheel, and a speed change driving member for moving a speed changing driving shaft back and forth to change the angle of the swash plate of the swash plate hydraulic motor. In addition, the starting clutch can be a torque converter.

By the configuration described above, the driving force upon low speed rotation of the engine whereupon the torque generated by the engine is low can be compensated by a torque amplification action of the torque converter.

According to another aspect, the power transmission apparatus for an engine of a vehicle can also be configured such that the crankshaft is disposed in a forward and backward direction of the vehicle while an axial line of a cylinder block is disposed in a substantially upward and downward direction, and an axis of the hydrostatic continuously variable transmission is set to a position higher than that of an axis of the crankshaft while an axis of the speed change driving shaft is disposed in the inside of an angle defined by a line segment passing the axis of the hydrostatic continuously variable transmission and the axis of the crankshaft and the axial line of the cylinder block.

With the configuration, even if a torque converter, which typically can have an increased outer diameter when compared with a centrifugal clutch, is incorporated, the hydrostatic continuously variable transmission can escape to a position higher than the position of the crankshaft. Further, the overall width of the engine can be reduced by disposing the speed change driving shaft in the inside of the angle defined by the line segment passing the axis of the hydrostatic continuously variable transmission and the axis of the crankshaft and the axial line of the cylinder block.

The above summary is not intended to describe each disclosed embodiment or every implementation of the present invention. Figures and the detailed description that follow more particularly exemplify embodiments of the invention. While certain embodiments will be illustrated and described, the invention is not limited to use in such embodiments.

BRIEF DESCRIPTION OF THE DRAWINGS

Aspects of the invention may be more completely understood in consideration of the following detailed description of various embodiments of the invention in connection with the accompanying drawings.

While the invention is amenable to various modifications and alternative forms, specifics thereof have been shown by way of example and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

In the following, the present invention is described with reference to the drawings taking an embodiment thereof that is applied to an off-road vehicle as an example.

Figure 1:
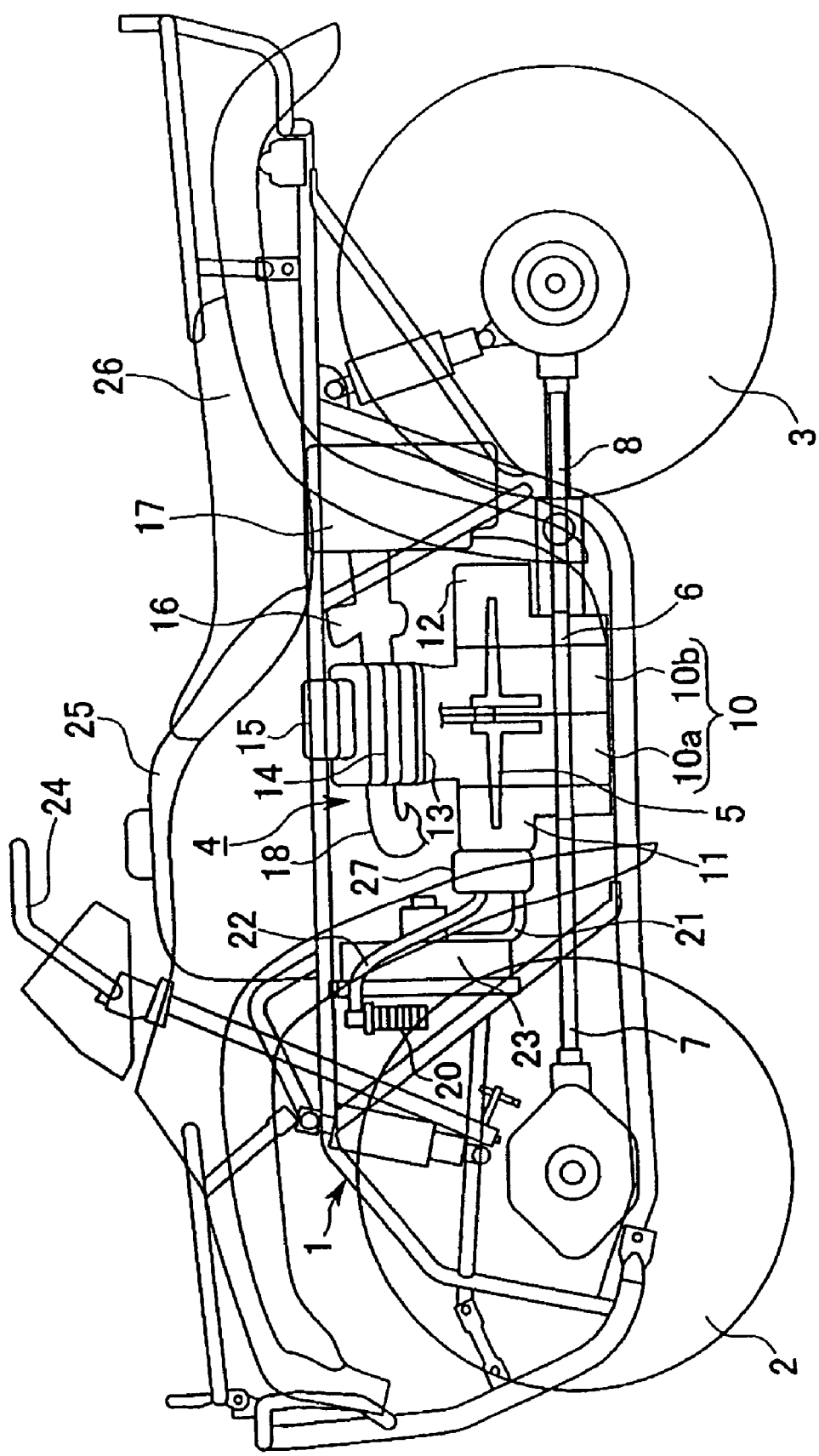
FIG. 1 is a side elevational view of a four-wheeled vehicle according to an embodiment of the present invention.

Referring to FIG. 1, a four-wheeled vehicle for running on an irregular ground is configured such that a pair of left and right front wheels (driving wheels) 2 and a pair of left and right rear wheels (driving wheels) 3 are provided on the front side and the rear sides of a body frame 1, respectively. A power unit 4 including a four-cycle engine and a transmission integrated with the engine is supported at a central portion of the body frame 1. The power unit 4 is of a longitudinal type in which a crankshaft 5 extends in a forward and backward direction of the vehicular body. The four-wheeled vehicle is of a four-wheeled drive type and includes an output shaft 6 provided at a lower portion of the power unit 4 and extending in parallel to the crankshaft 5. The output shaft 6 drives the front wheels 2 via a front wheel propeller shaft 7 and drives the rear wheels 3 via a rear wheel propeller shaft 8.

The front side of a crankcase 10 which composes the power unit 4 is covered with a front case cover 11, and the rear side of the crankcase 10 is covered with a rear case cover 12. The front case cover 11 and the rear case cover 12 cooperatively form the crankcase 10. The crankcase 10 is divided forwardly and backwardly into a front case 10a and a rear case 10b.

A cylinder block 13, a cylinder head 14, and a cylinder head cover 15 are mounted at an upper portion of the crankcase 10. A carburetor 16 is connected to an intake port of the cylinder head 14, and an air cleaner 17 is connected to the carburetor 16 from the rear side. An exhaust pipe 18 is connected to an exhaust port of the cylinder head 14.

An oil cooler 20 is disposed forward of the power unit 4. The oil cooler 20 communicates with an oil pump provided on the crankcase 10 through a feed side hose 21. Further, the oil cooler 20 communicates with the oil pump provided in the crankcase 10 through a return side hose 22. In FIG. 1, reference numeral 23 denotes a cooling fan, 24 a handle bar, 25 a fuel tank, and 26 a saddle type seat. Reference numeral 27 denotes an oil tank, which is attached directly to the front face of the front case cover 11. The oil tank 27 is connected to the oil cooler 20 through the feed side hose 21 and the return side hose 22 and is communicated also with the oil pump built in the power unit 4.

Figure 2:
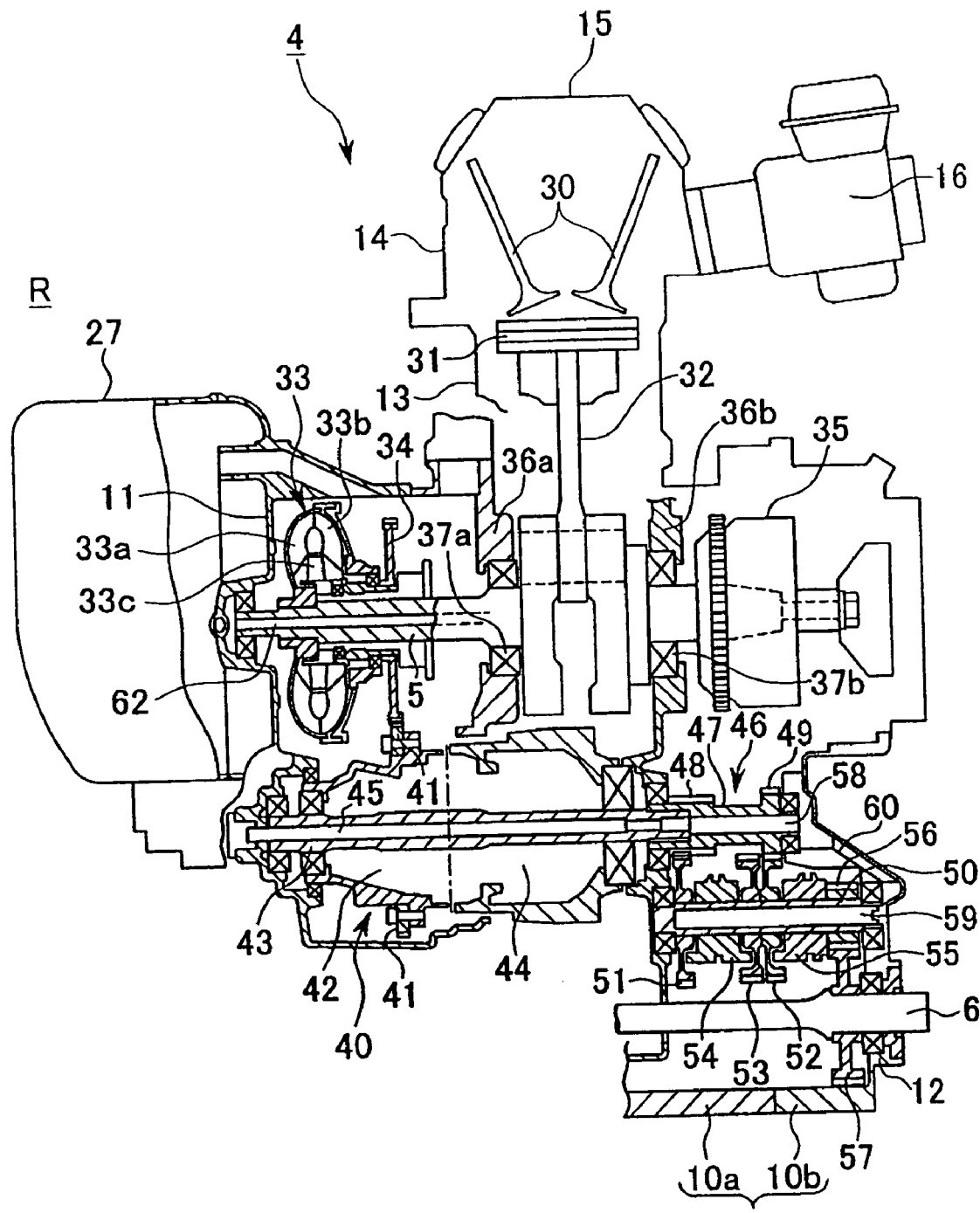
FIG. 2 is a schematic sectional view of a power unit according to an embodiment of the present invention.

The power unit 4 is described below with reference to FIG. 2. In particular, reference numeral 30 denotes a valve, 31 a piston, and 32 a connecting rod. A torque converter (starting clutch) 33 is provided at one end side of the crankshaft 5 to which the connecting rod 32 is attached. The torque converter 33 has a known structure including a pump shell 33a, a turbine runner 33b, and a stator 33c. The pump shell 33a is secured to the crankshaft 5, and the turbine runner 33b is connected to a primary driving gear 34. An ACG 35 is provided on the other end side of the crankshaft 5.

The crankshaft 5 is supported for rotation by a journal wall 36a integral with the front case 10a and a journal wall 36b integral with the rear case 10b through main bearings 37a and 37b, respectively. A hydrostatic continuously variable transmission 40 is built in the crankcase 10 that forms an engine section of the power unit 4. Approximately one-half of the hydrostatic continuously variable transmission 40 in its lengthwise direction is located between the main bearings 37a and 37b.

The hydrostatic continuously variable transmission 40 includes a hydraulic pump 42 of the swash plate type driven by a primary driven gear 41 held in meshing engagement with the primary driving gear 34. The hydrostatic continuously variable transmission 40 further includes a hydraulic motor 44 of the swash plate type driven by oil discharged from the hydraulic pump 42 for outputting rotational force at a changed speed to a driving shaft 43 that is a transmission shaft. The hydraulic motor 44 and the hydraulic pump 42 are disposed in parallel on the driving shaft 43. It is to be noted that, in FIG. 2, the internal structures of the hydraulic pump 42 and the hydraulic motor 44 are omitted for the convenience of illustration. The driving shaft 43 is disposed with an axis thereof directed in parallel to and in register with the crankshaft 5 in the forward and backward direction of the vehicle body. An oil passage 45 is formed along the axis of the driving shaft 43 in such a manner as to pass through the drive shaft 43 in the lengthwise direction. An end of the driving shaft 43 is directly connected by spline-coupling to a main shaft 47 of a multi-step transmission 46.

A first-speed driving gear 48 and a second-speed driving gear 49 are integrally provided on the main shaft 47. The gears 48 and 49 are disposed for meshing engagement with a first-speed driven gear 51 and a second-speed driven gear 52, respectively. The first-speed driven gear 51 and the second-speed driven gear 52 rotate on a countershaft 50 disposed in parallel to the main shaft 47. A reverse driven gear 53 is provided for rotation on the counter shaft 50. The reverse driven gear 53 is rotated in the direction reverse to the rotational direction of the first-speed driven gear 51 and the second-speed driven gear 52 through a reverse idle gear meshed with the first-speed drive gear 48 on a separate shaft not shown.

Shifters 54 and 55 are spline-coupled to the counter shaft 50 for movement in the axial direction. When the shifter 54 is at a position moved leftward in FIG. 2, rotation of the first-speed driven gear 51 is transmitted from the counter shaft 50 to a final driving gear 56 integrally provided at an axial end of the countershaft 50. The rotation is further transmitted to the output shaft 6 via a final driven gear 57 provided on the output shaft 6 and held in meshing engagement with the final drive gear 56.

When the shifter 55 is at the position moved leftwardly, rotation of the second-speed driven gear 52 is similarly transmitted to the output shaft 6, thereby achieving the second-speed drive mode. On the other hand, when the shifter 54 is at another position moved rightward, rotation of the reverse driven gear 53 is transmitted to the countershaft 50 to reversibly rotate the counter shaft 50 to reversibly rotate the output shaft 6, thereby achieving a backward drive mode. An oil passage 58 is formed along the axis of the main shaft 47 and extends through the main shaft 47 in a communicating relationship with the oil passage 45 of the drive shaft 43. Another oil passage 59 similar to the oil passage 58 is formed along the axis of the countershaft 50. The oil passage 59, however, is configured such that an inner end thereof is closed up and an open end thereof on the outer side is exposed to an oil passage 60 formed in a thick wall portion of the rear case cover 12. Oil having passed through the main shaft 47 is supplied to the oil passage 60. Oil supplied from the oil passage 59 is supplied, via an oil passage provided in the rear case cover 12 separately from the oil passage 60, to the ACG 35 and a valve mechanism of the cylinder head 14 to lubricate the ACG 35 and the valve mechanism. An oil passage 62 is formed also along the axis of the crankshaft 5. Oil is supplied to the oil passage 62 via an oil passage provided in the front case cover 11 and lubricates the torque converter 33 serving as a starting clutch and the bearing portions of the crankshaft 5.

Figure 3:
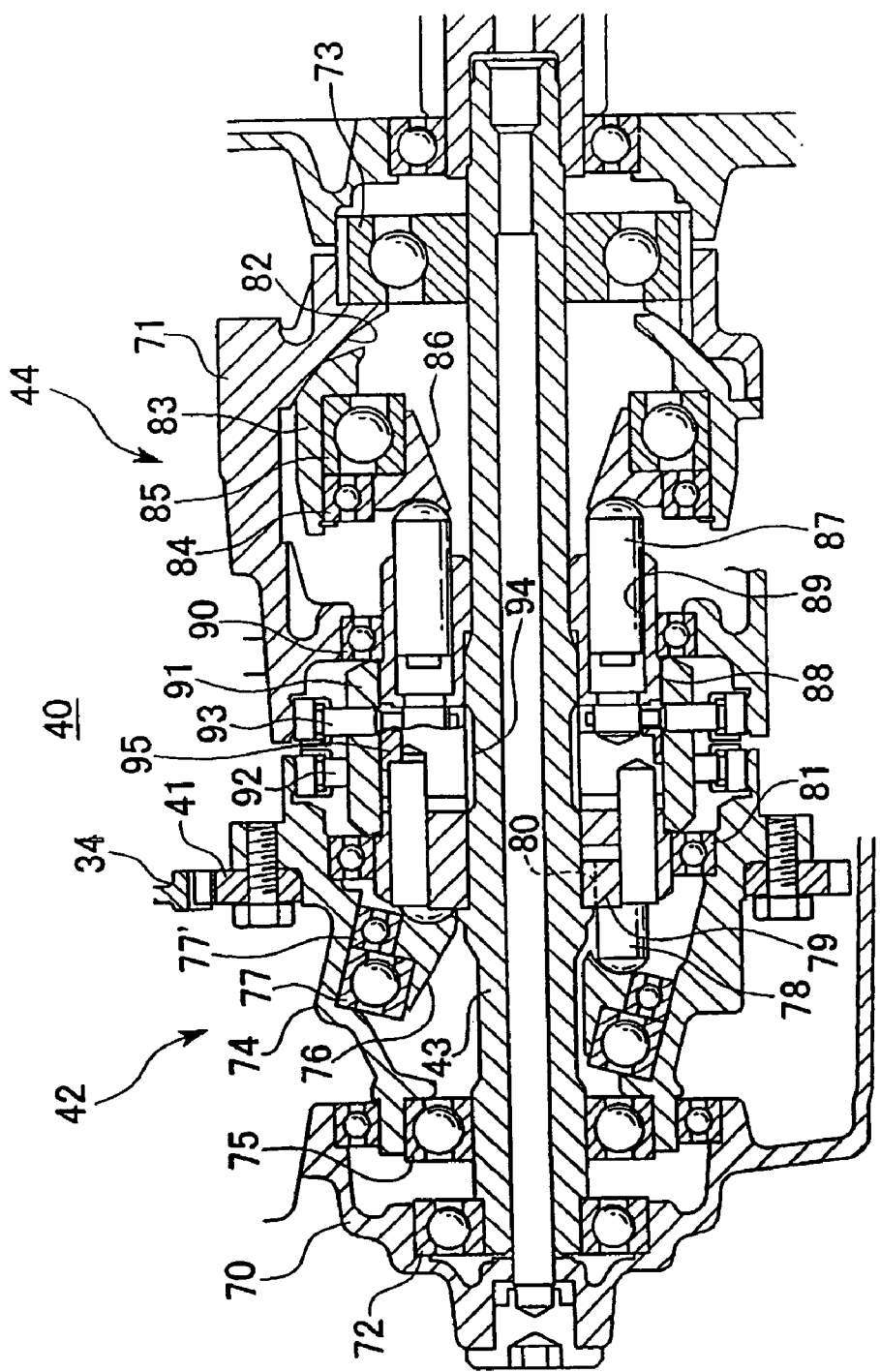
FIG. 3 is a longitudinal sectional view of the power unit of FIG. 2 taken along a plane parallel to several axes including a crankshaft and a driving shaft of a hydrostatic continuously variable transmission.

Now, the hydrostatic continuously variable transmission 40 is described with reference to FIG. 3. The hydrostatic continuously variable transmission 40 changes the speed of rotation of the crankshaft 5 in accordance with a difference in capacity between the hydraulic pump 42 and the hydraulic motor 44 to transmit the rotation at a reduced speed to the front wheels 2 and the rear wheels 3.

The hydraulic pump 42 and the hydraulic motor 44 which compose the hydrostatic continuously variable transmission 40 include housings 70 and 71, respectively. The housing 70 is formed integrally as part of the front case cover 11 while the housing 71 is formed integrally as part of the front case 10a. The driving shaft 43 is supported at the opposite ends thereof for rotation on the housings 70 and 71 through bearings 72 and 73, respectively.

The hydraulic pump 42 includes an input side rotary section 74 supported for rotation on the driving shaft 43 through a bearing 75. The input side rotary section 74 rotates integrally with the primary driven gear 41. A fixed swash plate 76 is supported for rolling contact with an inner periphery of the input side rotary section 74 through bearings 77 and 77' such that it is inclined with respect to an axial direction of the driving shaft 43. A pump cylinder 79 is provided in an opposing relationship to the fixed swash plate 76 on the driving shaft 43. A plurality of pump plunger holes 80 is disposed annularly around the axis of the pump cylinder 79 in the pump cylinder 79. A pump side plunger 78 is provided for back and forth movement in each of the pump plunger holes 80 and slideably contacts at an end thereof with the fixed swash plate 76 to perform an oil sucking stroke and an oil discharging stroke. The input side rotary section 74 is supported for relative rotation on an outer circumference of the pump cylinder 79 through a bearing 81.

Meanwhile, the hydraulic motor 44 includes a swash plate holder 83 of a substantially cup shape supported for rolling movement in a concave curved face portion 82 formed in the housing 71. A movable swash plate 86 is supported for rolling movement in the concave curved face through bearings 84 and 85. A swash plate is formed from the swash plate holder 83 and the movable swash plate 86.

A number of motor side plungers 87 equal to the number of the pump side plungers 78 are moved back and forth in motor plunger holes 89 from and toward the surface of the movable swash plate 86 to perform a projecting stroke and a retreating stroke. The motor plunger holes 89 are disposed annularly around an axis of a motor cylinder 88 provided on the axis of the driving shaft 43 similarly.

The motor side plungers 87 are projected by pressure oil discharged by the pump side plungers 78 and press the surface of the movable swash plate 86 to apply rotational force to the motor cylinder 88. Since the inner circumferential face of the motor cylinder 88 is held in a spline-coupled state with the outer periphery of the driving shaft 43, the motor cylinder 88 outputs the input power from the primary driven gear 41 at a changed speed to the driving shaft 43. The change gear ratio in this instance can be adjusted by varying the inclination of the movable swash plate 86, and the inclination of the movable swash plate 86 can be varied freely by rotating the swash plate holder 83. The motor cylinder 88 is supported at the outer periphery thereof for rotation on the housing 71 through a bearing 90.

More specifically, the change gear ratio of the driving shaft 43 with respect to the primary driven gear 41 (input side rotary section 74) is given by the following expression:

change gear ratio=(capacity of hydraulic motor 44)/(capacity of hydraulic pump 42)

Accordingly, if the capacity of the hydraulic motor 44 is varied from its maximum to zero, then the change gear ratio can be changed from a maximum value (the low gear state) to 1 (the top gear state).

The pump cylinder 79 and the motor cylinder 88 are integrated with each other at a great diameter portion 91 at a middle portion therebetween. A number of pump side valves 92 and motor side valves 93 equal to the number of pump side plungers 78 and motor side plungers 87 are disposed annularly in a juxtaposed relationship in two rows on the great diameter portion 91. The pump side valves 92 and the motor side valves 93 are disposed for movement in radial directions. The pump side valves 92 and the motor side valves 93 open and close communicating portions of an inner side passage 94 and an outer side passage 95 with the pump plunger holes 80 and the motor plunger holes 89, respectively. The inner side passage 94 and the outer side passage 95 are formed concentrically on the inner side of the great diameter portion 91.

In particular, in the suction stroke of the pump side plungers 78, the pump side valves 92 establish communication between the pump plunger holes 80 and the inner side passage 94 but interrupt the communication between the pump plunger holes 80 and the outer side passage 95. In the discharge stroke, the pump side valves 92 operate reversely. Similarly, in the projecting stroke of the motor side plungers 87, the motor side valves 93 establish communication between the motor plunger holes 89 and the outer side passage 95 but interrupt communication between the motor plunger holes 89 and the inner side passage 94. In the retreating stroke, however, the motor side valves 93 operate reversely.

Figure 4:
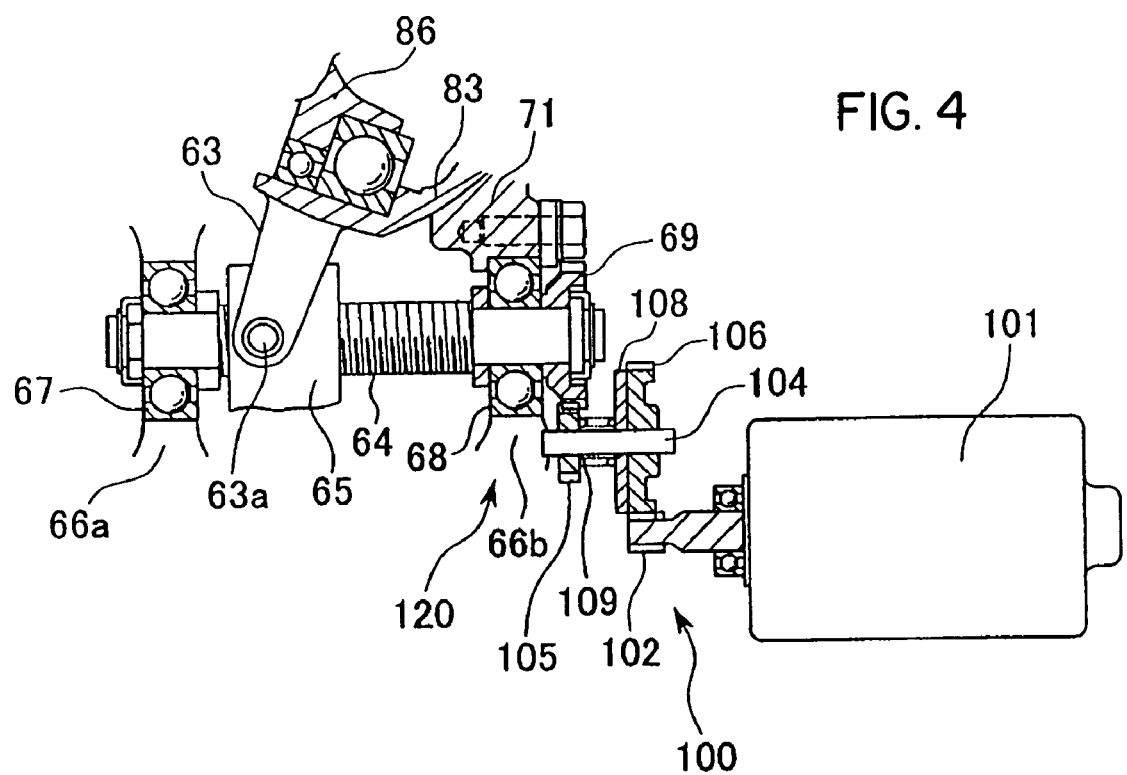
FIG. 4 is a sectional view of a ratio changing mechanism in accordance with an embodiment of the present invention.

Subsequently, a ratio changing mechanism 120 for changing the inclination angle of the movable swash plate 86 to change the change gear ratio is described with reference to FIG. 4. A link arm 63 projects to the outside of the housing 71 from the swash plate holder 83 in which the movable swash plate 86 is accommodated for rolling movement. The link arm 63 is connected at an end thereof for pivotal motion to a slider (speed change driving member) 65 on a ball screw (speed change driving shaft) 64 by means of a pin 63a. The inclination of the movable swash plate 86 can be varied by rotating the ball screw 64 forwardly or reversely to move the slider 65 axially in the leftward or rightward direction. The ball screw 64 is supported at the opposite ends thereof for rotation by bearings 67 and 68 on stays 66a and 66b integrated with the housing 71. A driven gear 69 is attached to an end of the ball screw 64.

The driven gear 69 is driven by an output gear 102 of an electric motor 101 through a torque limiter 100. The torque limiter 100 includes a rotary shaft 104. A second speed reduction gear 105 having a diameter smaller than that of the driven gear 69 is provided at an end of the rotary shaft 104 and held in engagement with the driven gear 69. A first speed reducing gear 106 having a diameter greater than that of the output gear 102 of the electric motor 101 is provided at the other end of the rotary shaft 104 and held in meshing engagement with the output gear 102.

The first speed reducing gear 106 includes a cylindrical member 108 for being coupled to or uncoupled from the rotary shaft 104 through a plurality of friction plates (not shown). The friction plates are pressed from the second speed reduction gear 105 side by a set spring 109 in the form of a coil spring to form a friction plate clutch mechanism.

In an ordinary state, torque within preset load of the set spring 109 is transmitted between the output gear 102 of the electric motor 101 and the driven gear 69. Accordingly, in the ordinary state, rotation of the output gear 102 is transmitted from the first speed reducing gear 106 to the rotary shaft 104 through the cylindrical member 108 and the friction plates on the inner side of the cylindrical member 108. The rotation is further transmitted from the second speed reduction gear 105 to the ball screw 64 through the driven gear 69.

As a result, when the ball screw 64 rotates, the slider 65 moves in response to the rotation of the ball screw 64 and pivots the swash plate holder 83 through the link arm 63 to change the inclination of the movable swash plate 86 supported on the inner side of the swash plate holder 83 thereby to adjust the change gear ratio. On the other hand, if the transmission torque between the output gear 102 and the driven gear 69 exceeds the preset load of the set spring 109, then a slip appears between the plurality of friction plates. Consequently, the rotation of the first speed reducing gear 106 is not transmitted to the rotary shaft 104 but is interrupted.

Subsequently, arrangement of the ratio changing mechanism 120 is described with reference to FIG. 5.

Figure 5:
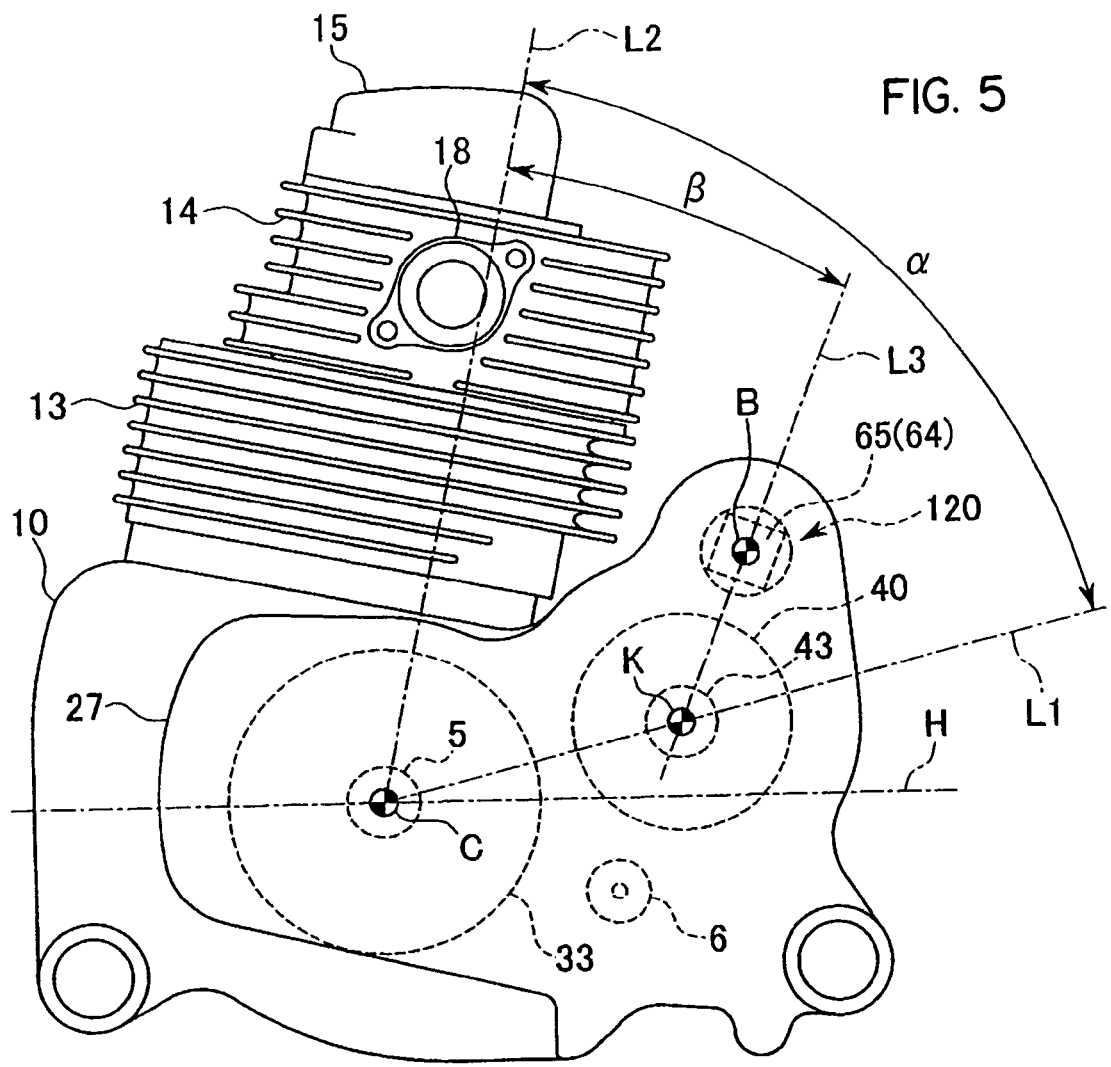
FIG. 5 is a schematic diagrammatic view of the power unit in accordance with an embodiment of the present invention as viewed from the front.

FIG. 5 is a schematic arrangement view of interior parts as viewed from the front side of the vehicle body.

The cylinder block 13 is attached to an upper portion of the crankcase 10, and the cylinder head 14 and the cylinder head cover 15 are attached to an upper portion of the cylinder block 13. The oil tank 27 is provided on the front face of the crankcase 10. It is to be noted that the exhaust pipe 18 is attached to the cylinder head 14.

The crankshaft 5 is disposed in the inside of the crankcase 10, and the torque converter 33 is attached to the crankshaft 5. The driving shaft 43 of the hydrostatic continuously variable transmission 40 is disposed on the right side of the crankshaft 5 above a horizontal line H which passes an axis C of the crankshaft 5. The output shaft 6 is disposed below the horizontal line H of the crankshaft 5.

An axis B of the ball screw 64 of the ratio changing mechanism 120 is disposed in the inside of an included angle α. The included angle α is defined by a line segment L1 passing an axis K of the driving shaft 43 of the hydrostatic continuously variable transmission 40 and the axis C of the crankshaft 5 and an axial line L2 of the cylinder block 13 disposed in a substantially upward and downward direction. The included angle α is set within a range from 60 to 90 degrees and preferably set to approximately 75 degrees. Meanwhile, an included angle β defined by a line segment L3 interconnecting the axis K of the driving shaft 43 of the hydrostatic continuously variable transmission 40 and the axis B of the ball screw 64 and the axial line L2 of the cylinder block 13 is set within a range from 0 to 15 degrees and preferably set to approximately 10 degrees.

According to the embodiment described above, the torque converter 33 is provided as a starting clutch. Consequently, the driving power upon low speed rotation of the engine whereupon the torque generated by the engine is low can be compensated by a torque amplification action of the torque converter 33. Accordingly, the ratio of the hydrostatic continuously variable transmission 40 need not be changed frequently, and an engine stall upon low speed rotation is substantially reduced and further stabilization of the vehicle speed can be realized. Accordingly, the embodiment described above can be applied suitably to an off-road vehicle which runs on an irregular ground at a low engine speed.

Consequently, the hydrostatic continuously variable transmission 40 is released from frequent ratio changing operations also where it is used as a multi-step transmission by fixing the angle of the movable swash plate 86 of the hydraulic motor 44.

Further, since the driving power upon low speed rotation of the engine whereupon the torque generated by the engine is low can be compensated by a torque amplification action of the torque converter 33, the stroke amount of the slider 65 which moves along the ball screw 64 can be designed smaller as much. Accordingly, miniaturization of the stepping motor can be realized, and the arrangement space can be reduced. Consequently, frequent ratio change is eliminated and the durability of the stepping motor can be improved. Accordingly, the requirement for a countermeasure for raising the durability is eliminated and reduction of the cost can be realized.

Further, the crankshaft 5 is disposed such that it extends in the forward and backward direction of the vehicle and the axial line L2 of the cylinder block 13 is disposed in the substantially upward and downward direction. Furthermore, the axis K of the driving shaft 43 of the hydrostatic continuously variable transmission 40 is set to a position higher than the horizontal line H passing the axis C of the crankshaft 5. In addition, the axis B of the ball screw 64 of the ratio changing mechanism 120 is disposed in the inside of the included angle α defined by the line segment L1 passing the axis K of the hydrostatic continuously variable transmission 40 and the axis C of the crankshaft and the axial line L2 of the cylinder block 13. Consequently, it is possible to dispose the hydrostatic continuously variable transmission 40 and the ratio changing mechanism 120, which significantly affects the widthwise dimension of the vehicle, rather near to the cylinder block 13 to reduce the overall width of the engine. Consequently, the mounting facility of the engine and the balance of the vehicle in the leftward and rightward direction can be improved.

It is to be noted that the present invention is not limited to the embodiment described above, and for example, equally applies to a three-wheeled vehicle. Further, while a four-wheeled drive vehicle is described as an example, the present invention can be applied also to a two-wheeled drive vehicle.

The above specification, examples and data provide a complete description of the manufacture and use of various aspects of the invention. Many alternative embodiments of the invention can be made without departing from the spirit and scope of the invention.

What is claimed is:

1. A power transmission apparatus for an engine of a vehicle which includes a starting clutch for smoothly connecting rotation of a crankshaft to a transmission upon starting of said vehicle, a hydrostatic continuously variable transmission for performing speed change depending upon a capacity difference between a swash plate hydraulic pump and a swash plate hydraulic motor to transmit rotation of said crankshaft at a reduced speed to a driving wheel, and a speed change driving member for moving a speed changing driving shaft back and forth to change an angle of the swash plate of said swash plate hydraulic motor, wherein said starting clutch is a torque converter, and wherein said crankshaft is disposed in a longitudinal direction of said vehicle, with an axial line of a cylinder block being disposed in a substantially vertical direction, and wherein an axis of said hydrostatic continuously variable transmission is set to a position higher than that of an axis of said crankshaft while an axis of said speed change driving shaft is set to a position higher than the axis of the hydrostatic continuously variable transmission and the axis of said speed change driving shaft is disposed inside of an acute angle defined by a line segment passing through the axis of said hydrostatic continuously variable transmission and the axis of said crankshaft and the axial line of said cylinder block.

2. The power transmission apparatus of claim 1, wherein said vehicle is an off-road vehicle.

3. A power transmission apparatus for an engine of a vehicle comprising: a starting clutch for smoothly connecting rotation of a crankshaft to a transmission upon starting of said vehicle, a hydrostatic continuously variable transmission for performing speed change depending upon a capacity difference between a swash plate hydraulic pump and a swash plate hydraulic motor to transmit rotation of said crankshaft at a reduced speed to a driving wheel, a speed change driving member for moving a speed changing driving shaft back and forth to change an angle of the swash plate of said swash plate hydraulic motor, and a means of converting torque; wherein the means for converting torque is the starting clutch, and wherein said crankshaft is disposed in a longitudinal direction of said vehicle, with an axial line of a cylinder block being disposed in a substantially vertical direction, and wherein an axis of said hydrostatic continuously variable transmission is set to a position higher than that of an axis of said crankshaft while an axis of said speed change driving shaft is set to a position higher than the axis of the hydrostatic continuously variable transmission and the axis of said speed change driving shaft is disposed inside of an acute angle defined by a line segment passing through the axis of said hydrostatic continuously variable transmission and the axis of said crankshaft and the axial line of said cylinder block.

4. The power transmission apparatus of claim 3, wherein said vehicle is an off-road vehicle.

5. A power transmission apparatus for an engine of a vehicle which includes a starting clutch for smoothly connecting rotation of a crankshaft to a transmission upon starting of said vehicle, a hydrostatic continuously variable transmission for performing speed change depending upon a capacity difference between a swash plate hydraulic pump and a swash plate hydraulic motor to transmit rotation of said crankshaft at a reduced speed to a driving wheel, and a speed change driving member for moving a speed changing driving shaft back and forth to change an angle of the swash plate of said swash plate hydraulic motor, and wherein said crankshaft is disposed in a longitudinal direction of said vehicle, with an axial line of a cylinder block being disposed in a substantially vertical direction, and wherein an axis of said hydrostatic continuously variable transmission is set to a position higher than that of an axis of said crankshaft while an axis of said speed change driving shaft is set to a position higher than the axis of the hydrostatic continuously variable transmission and the axis of said speed change driving shaft is disposed inside of an acute angle defined by a line segment passing through the axis of said hydrostatic continuously variable transmission and the axis of said crankshaft and the axial line of said cylinder block.

\* \* \* \* \*